(12) United States Patent
Su et al.

(10) Patent No.: US 12,387,697 B2
(45) Date of Patent: Aug. 12, 2025

(54) BULLET-SCREEN COMMENT DISPLAY

(71) Applicant: SHANGHAI BILIBILI TECHNOLOGY CO., LTD., Shanghai (CN)

(72) Inventors: Zhenyu Su, Shanghai (CN); Bei Haoyu Yao, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 362 days.

(21) Appl. No.: 18/172,130

(22) Filed: Feb. 21, 2023

(65) Prior Publication Data
US 2023/0267894 A1 Aug. 24, 2023

(30) Foreign Application Priority Data
Feb. 22, 2022 (CN) .......................... 202210164809.2

(51) Int. Cl.
*G09G 5/14* (2006.01)
*H04N 21/431* (2011.01)
*H04N 21/4788* (2011.01)

(52) U.S. Cl.
CPC ........... *G09G 5/14* (2013.01); *H04N 21/4316* (2013.01); *H04N 21/4788* (2013.01); *G09G 2340/125* (2013.01)

(58) Field of Classification Search
CPC ............ G06Q 20/0658; H04L 2209/56; H04L 9/0894; H04L 9/3236; H04L 9/3247; H04L 9/50; G09G 2340/125; G09G 5/14; H04N 21/4312; H04N 21/4316; H04N 21/4788; H04N 5/772; H04N 5/9201; H04N 5/928; Y10S 358/906
See application file for complete search history.

(56) References Cited

U.S. PATENT DOCUMENTS

| | | | |
|---|---|---|---|
| 2002/0056397 A1* | 5/2002 | Carr | F42B 12/34 102/509 |
| 2018/0262795 A1* | 9/2018 | Wang | H04N 21/44218 |
| 2019/0353958 A1* | 11/2019 | Mitobe | G02F 1/1335 |
| 2019/0384062 A1* | 12/2019 | Wilson | G06F 1/1656 |

\* cited by examiner

*Primary Examiner* — Ming Wu
(74) *Attorney, Agent, or Firm* — FisherBroyles, LLP

(57) ABSTRACT

A bullet-screen comment display method and apparatus are provided. The bullet-screen comment display method includes: receiving a to-be-displayed bullet-screen comment; determining a target bullet-screen comment display layer and a target bullet-screen comment display track that are associated with the to-be-displayed bullet-screen comment; and displaying, in the target bullet-screen comment display layer, the to-be-displayed bullet-screen comment based on the target bullet-screen comment display track.

17 Claims, 6 Drawing Sheets

BULLET-SCREEN COMMENT DISPLAY

CROSS-REFERENCE TO RELATED APPLICATIONS

This application claims priority to Chinese Patent Application No. 202210164809.2, filed on Feb. 22, 2022, the contents of which are hereby incorporated by reference in their entirety for all purposes.

TECHNICAL FIELD

This application relates to the technical field of generating a visual interface, and in particular, to a bullet-screen comment display method and apparatus.

BACKGROUND

With development of Internet technologies, more and more multimedia resources appear in people's lives. A bullet-screen comment associated with a multimedia resource is a relatively common function, and is sent by a user watching the multimedia resource.

SUMMARY

Some embodiments of this application provide a bullet-screen comment display method. Some embodiments of this application also provide a computing device and a non-transitory computer readable storage medium.

According to a first aspect of the embodiments of this application, a bullet-screen comment display method is provided, including:
  receiving a to-be-displayed bullet-screen comment;
  determining a target bullet-screen comment display layer and a target bullet-screen comment display track that are associated with the to-be-displayed bullet-screen comment; and
  displaying, in the target bullet-screen comment display layer, the to-be-displayed bullet-screen comment based on the target bullet-screen comment display track.

According to a second aspect of the embodiments of this application, a computing device is provided and includes:
  a memory and a processor, where
  the memory is configured to store computer executable instructions, and the processor is configured to execute the computer executable instructions to implement the steps of the bullet-screen comment display method.

According to a third aspect of the embodiments of this application, a non-transitory computer-readable storage medium is provided, where the non-transitory computer-readable storage medium stores computer executable instructions. When the instructions are executed by a processor, the steps of the bullet-screen comment display method are implemented.

DETAILED DESCRIPTION OF EMBODIMENTS

Figure 1:
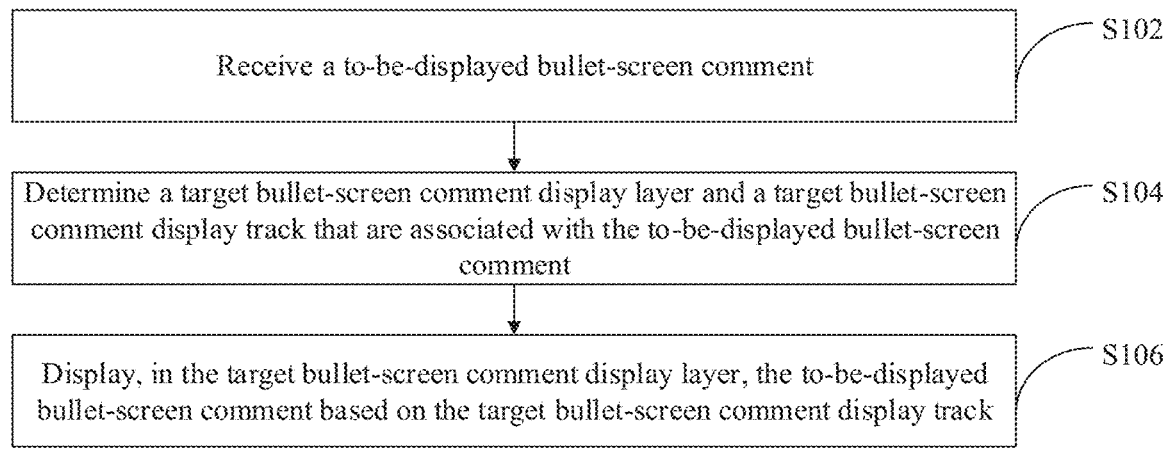
FIG. 1 is a flowchart of a bullet-screen comment display method according to some embodiments of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

In this application, a bullet-screen comment display method is provided. This application also relates to a bullet-screen comment display apparatus, a computing device, and a computer readable storage medium, which are described in detail in the following embodiments.

In the prior art, usually a client that enables a bullet-screen comment display function receives and displays bullet-screen comment information delivered by a server. However, in a case in which there is a relatively large quantity of bullet-screen comments, usually the bullet-screen comments travel through a display window of the client in batches, and the bullet-screen comments overlap with each other. Thus, a user who uses the client cannot see clearly bullet-screen comment content, which greatly affects viewing experience of the user. The client processes and renders a large quantity of bullet-screen comment information, but finally the user cannot see clearly the bullet-screen comment content, which causes a waste of a computing resource, and a large quantity of stacked bullet-screen comments also causes difficulties to a device that performs bullet-screen comment rendering. In addition, because a quantity of data carried in the bullet-screen comment information is too large, a client that performs bullet-screen comment processing faces great hardware pressure.

In an actual application, in a conventional bullet-screen comment display manner, a bullet-screen comment travels from a right end of a multimedia resource play window to a left end. Although a size and a color of the bullet-screen comment can be adjusted to a certain extent, a display form of the bullet-screen comment being monotonous cannot be covered up. A more serious problem is that when a quantity of bullet-screen comments is too large, the bullet-screen comments overlap with each other during display, which makes it difficult to distinguish between bullet-screen comment content, further reduces a user's perception of the bullet-screen comment, and too much bullet-screen comment processing and rendering are performed. Thus, computing resources of a client are heavily occupied, and a storage control and a data processing control in hardware are under great pressure. However, because the computing resources are occupied, processing and rendering of a multimedia resource by the client are also affected, and play of multimedia resources encounters freezing or frame loss.

In view of this, some embodiments of this application provide a bullet-screen comment display method, a computing device and a non-transitory computer readable storage medium, so as to resolve a problem in the prior art that when a large quantity of bullet-screen comments are processed, the bullet-screen comments are stacked with each other during display, which affects a visual effect, and causes a waste of a computing resource and heavy hardware pressure on a client.

The bullet-screen comment display method provided in this application includes: receiving a to-be-displayed bullet-screen comment; determining a target bullet-screen comment display layer and a target bullet-screen comment display track that are associated with the to-be-displayed bullet-screen comment; and displaying the to-be-displayed bullet-screen comment based on the target bullet-screen comment display layer and the target bullet-screen comment display track. Therefore, the to-be-displayed bullet-screen comment is layer-based and track-based processed, so that the to-be-displayed bullet-screen comment can effectively use a display area of the bullet-screen comment, and reduce poor perception caused by bullet-screen comment overlap. In addition, reducing overlap can further reduce image rendering pressure of a device for displaying the bullet-screen comment, save bullet-screen comment processing resources, and improve working efficiency of a bullet-screen comment processing program or apparatus. In addition, different display rules can be configured in different bullet-screen comment display layers and bullet-screen comment display tracks, so that display positions and display forms of the bullet-screen comment are diversified, thereby enriching bullet-screen comment display effects.

FIG. 1 is a flowchart of a bullet-screen comment display method according to some embodiments of this application. The method includes the following steps.

Step S102: Receive a to-be-displayed bullet-screen comment.

The to-be-displayed bullet-screen comment is a bullet-screen comment that is received by a client and that needs to be displayed in a corresponding multimedia resource play window.

Based on this, the bullet-screen comment that needs to be displayed in the multimedia resource play window is received by using a data receiving port of the client.

In some embodiments, considering that in an actual application scenario, different bullet-screen comments are displayed according to different display policies, to ensure that a bullet-screen comment effect after display meets a viewing requirement of a user, a display policy corresponding to the to-be-displayed bullet-screen comment needs to be detected after obtaining the to-be-displayed bullet-screen comment, and a display manner of the to-be-displayed bullet-screen comment is determined according to a preset display policy for the to-be-displayed bullet-screen comment. In this embodiment, an exemplary implementation is as follows:

determining a display policy for the to-be-displayed bullet-screen comment, and determining whether the display policy is a target display policy; if yes, performing a step of determining a target bullet-screen comment display layer and a target bullet-screen comment display track that are associated with the to-be-displayed bullet-screen comment; and if no, processing and displaying the to-be-displayed bullet-screen comment according to the display policy.

The bullet-screen comment display policy represents a final presentation effect of the bullet-screen comment in a play interface of a target multimedia resource. For example, "member bullet-screen comment" and "noble bullet-screen comment" that are used when the bullet-screen comment is displayed on a video play interface are bullet-screen comment display policies. The target display policy is a display policy for displaying a to-be-displayed bullet-screen comment in the bullet-screen comment display method in this application. The target display policy may include multiple configurations. For example, a New Year bullet-screen comment display policy may include a configuration with a red lantern pattern at the head and the tail of the bullet-screen comment, and a configuration with a firecracker pattern at the head and the tail of the bullet-screen comment. A specific quantity of configuration forms is determined according to an actual use scenario. This is not limited in this embodiment.

Based on this, a display policy indicating a final presentation effect of the to-be-displayed bullet-screen comment in the target multimedia resource is determined. If the display policy for the to-be-displayed bullet-screen comment is the target presentation policy, step S104 is performed. In a case in which the display policy for the to-be-displayed bullet-screen comment is not the target presentation policy, display is performed according to the display policy for the to-be-displayed bullet-screen comment.

It should be noted that, in a case in which display policies in the to-be-displayed bullet-screen comment are different, priorities may be set for different display policies, and a bullet-screen comment of a bullet-screen comment display policy with a highest priority is preferentially displayed, and bullet-screen comments of other bullet-screen comment display polices are discarded; or bullet-screen comments of different types of bullet-screen comment display policies are simultaneously displayed; or different bullet-screen comment levels are divided for bullet-screen comments with different display policies for layer-based display. A specific display form is determined by using an actual scenario. This is not limited in this embodiment.

For example, a user A watches a video B by using a mobile phone A, the mobile phone A receives a bullet-screen comment 1, and then detects that a display policy for the bullet-screen comment 1 is a Spring Festival bullet-screen comment display policy, and the Spring Festival bullet-screen comment display policy is a target display policy. In this case, the bullet-screen comment 1 performs subsequent steps of the bullet-screen comment display method in this embodiment of the specification.

In summary, the display policy for the to-be-displayed bullet-screen comment is confirmed, so that the to-be-displayed bullet-screen comment can be subsequently displayed according to a preset display policy, and a display process of the to-be-displayed bullet-screen comment is ensured according to an expectation, so that the display process is controllable.

Step S104: Determine a target bullet-screen comment display layer and a target bullet-screen comment display track that are associated with the to-be-displayed bullet-screen comment.

After the to-be-displayed bullet-screen comment is received, a bullet-screen comment display layer in which the to-be-displayed bullet-screen comment is located and a bullet-screen comment display track in which the to-be-displayed bullet-screen comment is located need to be determined for the to-be-displayed bullet-screen comment.

The target bullet-screen comment display layer may be understood as a bullet-screen comment display layer in which the to-be-displayed bullet-screen comment is displayed, and the target bullet-screen comment display track may be understood as a bullet-screen comment display track in which the to-be-displayed bullet-screen comment is displayed. It should be noted that the bullet-screen comment display layer is an area that exists in a multimedia resource play window, the bullet-screen comment is displayed in this area, and the bullet-screen comment display track is an area divided in the bullet-screen comment display layer, and is used to limit an action track that the bullet-screen comment is displayed in the bullet-screen comment display layer. Therefore, both the target bullet-screen comment display layer and the target bullet-screen comment display track are associated with the to-be-displayed bullet-screen comment, that is, the target bullet-screen comment display track exists in the target bullet-screen comment display layer, and the to-be-displayed bullet-screen comment is displayed in the target bullet-screen comment display track in the target bullet-screen comment display layer.

Based on this, after the to-be-displayed bullet-screen comment is received, a display area of the to-be-displayed bullet-screen comment in the multimedia resource play window, that is, the target bullet-screen comment display layer, is determined, and a bullet-screen comment display track of the to-be-displayed bullet-screen comment in the target bullet-screen comment display layer, that is, the target bullet-screen comment display track, is determined.

In some embodiments, before the target bullet-screen comment display layer is selected, a bullet-screen comment display layer needs to be constructed, and a bullet-screen comment display track in the bullet-screen comment display layer further needs to be created. In this embodiment, an exemplary implementation is as follows:

receiving bullet-screen comment display rule information and bullet-screen comment display layer information that are delivered by a server; creating a bullet-screen comment display layer and a bullet-screen comment display track in the bullet-screen comment display layer according to the bullet-screen comment display layer information; and configuring a rule for the bullet-screen comment display layer and a corresponding bullet-screen comment display track based on the bullet-screen comment display rule information.

The bullet-screen comment display rule information and the bullet-screen comment display layer information are delivered by the server, and the information is formulated by a player maintenance party corresponding to the multimedia resource play window. For example, for a video website, a developer or a maintainer of the video website formulates the bullet-screen comment display rule information and the bullet-screen comment display layer information. When the user logs in to the video website to watch a video, the bullet-screen comment display rule information and the bullet-screen comment display layer information are delivered to the client of the user.

The bullet-screen comment display layer information may be understood as information specifying attributes such as a size, a shape, a position, and an overlap sequence of the bullet-screen comment display layer and the bullet-screen comment display track in the multimedia resource play window. It should be noted that the bullet-screen comment display rule information is set to create the bullet-screen comment display layer and the bullet-screen comment display track, and a type of information carried therein may be set according to an actual use scenario. This is not limited in this embodiment of this specification.

The bullet-screen comment display rule information may be understood as specifying a rule to be executed for a displayed bullet-screen comment when the created bullet-screen comment display layer and bullet-screen comment display track display the bullet-screen comment. It should be noted that the specific information type in the bullet-screen comment display rule information is also set according to an actual use scenario. This is not limited in this embodiment of this specification.

Based on this, the maintainer of the player formulates the bullet-screen comment display rule information and the bullet-screen comment display layer information, and then delivers, by using the server, the two information to a client that uses the player to play a multimedia resource. The client determines, based on the bullet-screen comment display layer information, attributes such as a size, a shape, a quantity, and an overlap layer level of the bullet-screen comment display layer, as well as attributes such as a shape and a width of the bullet-screen comment display track, the bullet-screen comment display layer, and a position of the bullet-screen comment display layer on which the bullet-screen comment display track is located, and creates the bullet-screen comment display layer and the bullet-screen comment display track. Then, the display rule, the movement rule, and the like used when the bullet-screen comment display layer and the bullet-screen comment display track display the bullet-screen comment are displayed according to the bullet-screen comment display rule information.

Still using the foregoing example, the user A watches the video B by using the mobile phone A, and a player C plays the video B. The development company of the player C formulates the bullet-screen comment display rule information and the bullet-screen comment display layer information, and then delivers the two information to the mobile phone A by using the server. The player C in the mobile phone A creates, according to the bullet-screen comment display layer information, a bullet-screen comment display layer 1 and a bullet-screen comment display layer 2 that have a same shape as a rectangular play window of the player C, where the bullet-screen comment display layer 1 is above the bullet-screen comment display layer 2. A bullet-screen comment display layer 3 is created which is similar in shape to the play window but corresponding side length is one half of the side length of the playing window, and whose geometric center coincides with that of the play window. Then, bullet-screen comment display tracks in the bullet-screen comment display layers 1, 2, and 3 are configured based on the bullet-screen comment display rule information, to obtain a vertical direction of the bullet-screen comment display layer 1, where a width is one tenth of a length of a bottom side of the bullet-screen comment display layer 1, and 10 rectangular bullet-screen comment display tracks are densely arranged; obtain a horizontal direction of the bullet-screen comment display layer 2, where a width is one ninth of a side length of the bullet-screen comment display layer 2, a spacing is one third of a side length of the bullet-screen comment display layer 2, and three rectangular bullet-screen comment display tracks are arranged from an edge of the bullet-screen comment display layer 2; and obtain a start point of the bullet-screen comment display layer 3 on a bottom side of the bullet-screen comment display layer 3, an end point of the bullet-screen comment display layer 3 on a right side of the bullet-screen comment display layer 3, a center thereof is at a lower right corner of the bullet-screen comment display layer 3, a width thereof is one tenth of the length of the bottom side of the bullet-screen comment display layer 3, and 10 fan-ring bullet-screen comment display tracks are densely arranged.

Then, based on the bullet-screen comment display rule information, the bullet-screen comment display layer 1 is configured to display only the bullet-screen comment sent by the member user, the bullet-screen comment display layer 2 is configured to display only the bullet-screen comment sent by the user A, and the bullet-screen comment display layer 3 is configured to display the remaining bullet-screen comment. It is configured that bullet-screen comments displayed on the 10 bullet-screen comment display tracks in the bullet-screen comment display layer 1 according to the bullet-screen comment display rule information are shown in red regular script, the front part of the bullet-screen comment carries a member mark, and the bullet-screen comment is slidably displayed at a velocity of 1 mm/s from bottom to top; it is configured that bullet-screen comments displayed on two bullet-screen comment display tracks adjacent to the bullet-screen comment display layer 2 in the bullet-screen comment display layer 2 are shown in black Song typeface, and are slidably displayed from left to right at an initial velocity of 2 mm/s and an acceleration of 2 mm/s$^2$, and the bullet-screen comment in the middle bullet-screen comment display track is in white Song typeface and slidably displayed from right to left at a velocity of 1 mm/s; it is configured that bullet-screen comments displayed in the 10 bullet-screen comment display tracks of the bullet-screen comment display layer 3 are shown in white regular script, and the bullet-screen comments are displayed along the bullet-screen comment display track at a velocity of 1 mm/s.

In conclusion, the bullet-screen comment display layer and the bullet-screen comment display track are created by using the foregoing method, which provides a basis for displaying the to-be-displayed bullet-screen comment. It should be noted that, by using the bullet-screen comment display rule information and the bullet-screen comment display layer information, a bullet-screen comment switch may be configured in the multimedia resource display window, and a corresponding bullet-screen comment display layer is not displayed in a corresponding bullet-screen comment display track, so that the user can selectively display the bullet-screen comment to be displayed in the expected bullet-screen comment display layer or the expected bullet-screen comment display track.

In some embodiments, because the to-be-displayed bullet-screen comment is displayed in the target bullet-screen comment display layer, when the multimedia resource play window needs to display the to-be-displayed bullet-screen comment, the target bullet-screen comment display layer needs to be determined in all bullet-screen comment display layers based on the to-be-displayed bullet-screen comment. In this embodiment, an exemplary implementation is as follows:

determining bullet-screen comment state information of the to-be-displayed bullet-screen comment; and determining, from at least one preset bullet-screen comment display layer according to the bullet-screen comment state information, the target bullet-screen comment display layer associated with the to-be-displayed bullet-screen comment.

The bullet-screen comment state information may be understood as an attribute of the to-be-displayed bullet-screen comment, and may include information such as a bullet-screen comment source, a bullet-screen comment sender attribute, and a bullet-screen comment configuration. In addition, the bullet-screen comment state information may further include a specific selection rule, such as random selection, or a bullet-screen comment display layer with a highest priority. The selection rule included in the bullet-screen comment state information is set according to an actual use scenario, and is not limited in this embodiment. The bullet-screen comment display layer may be understood as planning for a bullet-screen comment display area in a process of displaying a bullet-screen comment. It should be noted that the bullet-screen comment display layer may not only be one layer. When overlap positions of multiple bullet-screen comment display layers are generated, the bullet-screen comment display layers have priorities, a bullet-screen comment display layer with a higher priority is above a bullet-screen comment display layer with a lower priority, and bullet-screen comment information in the bullet-screen comment display layer with a higher priority may overlay or shield bullet-screen comment information in the bullet-screen comment display layer with a lower priority in a display process.

Based on this, the bullet-screen comment state information of the to-be-displayed bullet-screen comment is determined, and the bullet-screen comment display layer of the to-be-displayed bullet-screen comment is determined according to content indicated in the bullet-screen comment state information, where the selected bullet-screen comment display layer is the target bullet-screen comment display layer. Therefore, a determining process of the target bullet-screen comment display layer may be understood in actual application as follows: According to whether the to-be-displayed bullet-screen comment is sent by a member user, in a case in which the to-be-displayed bullet-screen comment is sent by a member user, the to-be-displayed bullet-screen comment is displayed in a bullet-screen comment display layer dedicated to the member user; and if the to-be-displayed bullet-screen comment is not sent by a member user, the to-be-displayed bullet-screen comment is displayed in a bullet-screen comment display layer dedicated to a non-member user. Alternatively, depending on whether a bullet-screen comment mode is enabled for the to-be-displayed bullet-screen comment, the to-be-displayed bullet-screen comment is displayed on a dedicated bullet-screen comment display layer if enabled, and the to-be-displayed bullet-screen comment is displayed on another bullet-screen comment display layer if not enabled. It should be noted that there are multiple selection criteria for the bullet-screen comment display layer. A specific selection manner of the bullet-screen comment display layer is determined according to an actual application scenario. This is not limited in this embodiment. Similarly, for the bullet-screen comment state information including the selection criteria of the bullet-screen comment display layer, a type of information related to the to-be-displayed bullet-screen comment included therein is not limited in this embodiment.

According to the foregoing example, the bullet-screen comment state information of the bullet-screen comment 1 is determined, where the bullet-screen comment 1 is marked as a bullet-screen comment sent by the user A. Therefore, the bullet-screen comment display layer 2 is determined as the target bullet-screen comment display layer.

In conclusion, the bullet-screen comment display layer in which the to-be-displayed bullet-screen comment is located is determined by using the bullet-screen comment state information of the to-be-displayed bullet-screen comment. In an implemented bullet-screen comment display process, the bullet-screen comment is displayed in layers, thereby enriching display forms of the bullet-screen comment. In addition, different bullet-screen comment display layers have different display rules, so that the bullet-screen comment display forms are more abundant. In this layer-based display form, bullet-screen comments are classified and displayed on different display layers. This display form can effectively display a large quantity of bullet-screen comments at a same time, reduce calculation and rendering pressure of a device, and reduce a system freezing problem.

In some embodiments, in a process of determining the target bullet-screen comment display layer of the to-be-displayed bullet-screen comment, the bullet-screen comment display layer of the to-be-displayed bullet-screen comment may be determined based on that the to-be-displayed bullet-screen comment is sent by a user of a current video play device or sent by another user, to select the target bullet-screen comment display layer. In this embodiment, an exemplary implementation is as follows:

determining an obtaining path of the to-be-displayed bullet-screen comment; and determining the bullet-screen comment state information of the to-be-displayed bullet-screen comment based on the obtaining path; and correspondingly, the determining, according to the bullet-screen comment state information, the target bullet-screen comment display layer associated with the to-be-displayed bullet-screen comment includes:

in a case in which the bullet-screen comment state information is guest bullet-screen comment state information, selecting a guest bullet-screen comment display layer associated with the to-be-displayed bullet-screen comment as the target bullet-screen comment display layer; and in a case in which the bullet-screen comment state information is host bullet-screen comment state information, selecting a host bullet-screen comment display layer associated with the to-be-displayed bullet-screen comment as the target bullet-screen comment display layer.

The obtaining route of the to-be-displayed bullet-screen comment may be understood as follows: The to-be-displayed bullet-screen comment is a bullet-screen comment sent by another user against the target multimedia resource or a bullet-screen comment sent by the user against the target multimedia resource to a client operated by the user; and the host bullet-screen comment state information may be understood as recording the bullet-screen comment state information of the to-be-displayed bullet-screen comment that is sent by the user to the client, and the guest bullet-screen comment state information may be understood as recording the bullet-screen comment state information of the to-be-displayed bullet-screen comment that is delivered by the server. The host bullet-screen comment display layer is a bullet-screen comment display layer that is used to display a bullet-screen comment that is sent by a user for a target multimedia resource to a client operated by the user, and the guest bullet-screen comment display layer is a bullet-screen comment display layer that is used to display a bullet-screen comment that is sent by another user for the target media resource and that is delivered by the server.

Based on this, it is determined whether the to-be-displayed bullet-screen comment is a bullet-screen comment sent by another user delivered from the client or a bullet-screen comment sent by the user to the client operated by the user. In the former case, the bullet-screen comment state information of the to-be-displayed bullet-screen comment is the guest bullet-screen comment state information, and in the latter case, the bullet-screen comment state information of the to-be-displayed bullet-screen comment is the host bullet-screen comment state information. In a case in which the bullet-screen comment state information is the guest bullet-screen comment state information, a dedicated bullet-screen comment display layer of the bullet-screen comment sent by another user delivered by the server is selected as the guest bullet-screen comment display layer, and in a case in which the bullet-screen comment state information is the host bullet-screen comment state information, a dedicated bullet-screen comment display layer of the bullet-screen comment sent by the user to the client operated by the client is selected as the host bullet-screen comment display layer.

Still using the foregoing example, it is determined that the bullet-screen comment 1 is a bullet-screen comment that is sent by the user A to the mobile phone A, that the bullet-screen comment state information of the bullet-screen comment 1 is the host bullet-screen comment state information, and the bullet-screen comment display layer 2 that only displays the bullet-screen comment state information is the host state bullet-screen comment state information is used as the target bullet-screen comment display layer of the bullet-screen comment 1.

In conclusion, by using the obtaining path of the to-be-displayed bullet-screen comment, the bullet-screen comment state information of the to-be-displayed bullet-screen comment can be learned, and the bullet-screen comment state information is obtained in an intuitive and easy manner.

In some embodiments, when the to-be-displayed bullet-screen comment is displayed, in addition to determining the bullet-screen comment display layer on which the to-be-displayed bullet-screen comment needs to be displayed, the bullet-screen comment display track on which the bullet-screen comment needs to be displayed needs to be determined. In this embodiment, an exemplary implementation is as follows:

determining bullet-screen comment display track information of the to-be-displayed bullet-screen comment; and determining, from at least one preset bullet-screen comment display track according to the bullet-screen comment display track information, the target bullet-screen comment display track associated with the to-be-displayed bullet-screen comment.

The bullet-screen comment display track information may be understood as including a selection rule for selecting a bullet-screen comment display track to display the to-be-displayed bullet-screen comment. It should be noted that the selection rule for selecting a bullet-screen comment display track may be random selection, may be left-to-right or top-to-bottom, or the like. A specific setting manner is determined according to an actual use scenario, and is not limited in this embodiment.

Based on this, the bullet-screen comment display track information including a selection rule for selecting a bullet-screen comment display track to display the to-be-displayed bullet-screen comment is included, and the bullet-screen comment display track is selected from all bullet-screen comment display tracks in the target bullet-screen comment display layer according to the bullet-screen comment display track information, and the to-be-displayed bullet-screen comment is displayed in the target bullet-screen comment display track.

Still using the foregoing example, it is determined according to the bullet-screen comment display track information of the bullet-screen comment 1. A manner of determining the bullet-screen comment display track information of the bullet-screen comment 1 is random selection, and based on the bullet-screen comment display track information, it is determined that the target bullet-screen comment display track is the top bullet-screen comment display track in the bullet-screen comment display layer 2.

In conclusion, the target bullet-screen comment display track of the to-be-displayed bullet-screen comment is determined by using the bullet-screen comment display track information, so that a display position of the to-be-displayed bullet-screen comment is determined, and a display track of the to-be-displayed bullet-screen comment is determined.

Step S106: Display, in the target bullet-screen comment display layer, the to-be-displayed bullet-screen comment based on the target bullet-screen comment display track.

In some embodiments, after the target bullet-screen comment display layer and the target bullet-screen comment display track that are corresponding to the to-be-displayed bullet-screen comment are determined, the to-be-displayed bullet-screen comment further needs to be displayed.

Based on this, in a process of displaying the to-be-displayed bullet-screen comment based on the target bullet-screen comment display layer and the target bullet-screen comment display track, because of different characteristics of the bullet-screen comment display layer and the bullet-screen comment display track, when the to-be-displayed bullet-screen comment is displayed in the target bullet-screen comment display layer and the target bullet-screen comment display track, the to-be-displayed bullet-screen comment needs to comply with a display rule of the target bullet-screen comment display layer and the target bullet-screen comment display track.

In some embodiments, to ensure that a large quantity of bullet-screen comments in to-be-displayed bullet-screen comments are not displayed simultaneously at a same moment, causing a problem of crowded stacking between the bullet-screen comments, and increasing a processing pressure of a bullet-screen comment display device, the bullet-screen comments in the display process may be deleted to some extent. An exemplary implementation. of this embodiment is as follows:

detecting whether a displayed bullet-screen comment exists in the target bullet-screen comment display track; if a displayed bullet-screen comment does not exist, performing the step of displaying, in the target bullet-screen comment display layer; the to-be-displayed bullet-screen comment based on the target bullet-screen comment display track; if a displayed bullet-screen comment exists, detecting whether there is a bullet-screen comment overlap area between the displayed bullet-screen comment and the to-be-displayed bullet-screen comment; if no, performing the step of displaying, in the target bullet-screen comment display layer, the to-be-displayed bullet-screen comment based on the target bullet-screen comment display track; and if yes, deleting the to-be-displayed bullet-screen comment.

The displayed bullet-screen comment may be understood as a bullet-screen comment being displayed, and the bullet-screen comment overlap area may be understood as two bullet-screen comments being displayed existing in this area at a same moment.

Based on this, first, the target bullet-screen comment display track is detected, and whether a bullet-screen comment being displayed exists in the target bullet-screen comment display track is detected. If no bullet-screen comment being displayed exists in the target bullet-screen comment display track, the to-be-displayed bullet-screen comment is displayed in the target bullet-screen comment display track. If a bullet-screen comment being displayed exists in the target bullet-screen comment display track, second detection needs to be performed to detect whether there is overlap between the bullet-screen comment being displayed in the target bullet-screen comment display track and the to-be-displayed bullet-screen comment, and when there is overlap, the to-be-displayed bullet-screen comment is deleted and not displayed. When there is no overlap, the to-be-displayed bullet-screen comment is displayed. It should be noted that, when it is determined whether there is overlap between the to-be-displayed bullet-screen comment and the bullet-screen comment being display in the target bullet-screen comment display track, a time relationship between the bullet-screen comment being displayed and the to-be-displayed bullet-screen comment may be selected to determine, for example, a start time of determining that the to-be-displayed bullet-screen comment enters a target bullet-screen comment display area, and an end time of completing display of the to-be-displayed bullet-screen comment in the target bullet-screen comment display area. Comparing the start time with the end time, if the end time is greater than or equal to the start time, it indicates that the bullet-screen comment being displayed completely overlaps from a start point of the target bullet-screen comment display track, and all content of the bullet-screen comment is completely displayed. In this case, the to-be-displayed bullet-screen comment starts to be displayed from the start point of the target bullet-screen comment display track, so that it can be determined that there must be no overlap between the two. In addition, a method such as determining whether there is overlap between the bullet-screen comment being displayed and the to-be-displayed bullet-screen comment in the target bullet-screen comment display track may further be used. A specific determining method is determined according to an actual use scenario, and is not limited in this embodiment.

Still using the foregoing example, in the top bullet-screen comment display track in the bullet-screen comment display layer 2, the bullet-screen comment 2 that is being displayed slides from left to right, a time at which the bullet-screen comment 2 completely slides from the left side of the target bullet-screen comment display track is denoted as t2, and a time at which the bullet-screen comment 1 is displayed is t1, and t1<t2 is determined. In this case, the bullet-screen comment 1 is displayed based on a corresponding display rule of the target bullet-screen comment display track.

In conclusion, by processing the to-be-displayed bullet-screen comment in the foregoing method, a case in which the bullet-screen comments do not overlap with each other in a process of displaying the bullet-screen comments can be implemented, rendering pressure of the apparatus on the bullet-screen comment information is reduced, fluency of the bullet-screen comment is ensured, and a processing resource is saved.

In some embodiments, when the to-be-displayed bullet-screen comment is being displayed, to ensure diversification of the to-be-displayed bullet-screen comment display process; display information of the to-be-displayed bullet-screen comment needs to be configured based on the target bullet-screen comment display track. In this embodiment, an exemplary implementation is as follows:

determining a bullet-screen comment display rule corresponding to the target bullet-screen comment display track; updating bullet-screen comment size information, bullet-screen comment font information, bullet-screen comment color information, and bullet-screen comment configuration information of the to-be-displayed bullet-screen comment based on the bullet-screen comment display rule, to obtain a first target bullet-screen comment; and displaying the first target bullet-screen comment in the target bullet-screen comment display layer.

The bullet-screen comment size information may be understood as information that includes a font size in a process of displaying the to-be-displayed bullet-screen comment. The bullet-screen comment font information may be understood as information that includes a font used in a process of displaying the bullet-screen comment. The bullet-screen comment color information may be understood as information that includes a color presented in a display process of the to-be-displayed bullet-screen comment; The bullet-screen comment configuration information may be understood as including some dedicated accessories configured in a display process of the to-be-displayed bullet-screen comment, such as a member identifier, a spring festival lantern, a color light, a Chinese knot, and tassels, and a specific included style is set according to an actual use scenario, which is not limited in this embodiment.

Based on this, the bullet-screen comment display rule configured for the target bullet-screen comment display track is determined, and information about a size, a font, a color, an accessory, and the like of the to-be-displayed bullet-screen comment is updated according to the bullet-screen comment display rule corresponding to the target bullet-screen comment display track. In this case, the updated bullet-screen comment is a first target bullet-screen comment, and the obtained first target bullet-screen comment is displayed in the target bullet-screen comment display layer.

Still using the foregoing example, the bullet screen comment display rule for the top bullet-screen comment display track of the bullet-screen comment display layer 2 is obtained as that a width is one-ninth of a side length of the bullet-screen comment display layer 2, and the bullet-screen comment is shown in black Song typeface. The bullet-screen comment 1 is configured based on this bullet-screen comment display rule, to obtain a first target bullet-screen comment shown in black Song typeface in which a size of each word in the bullet-screen comment is one-ninth of the side length of the bullet-screen comment display layer 2. The first target bullet-screen comment is displayed on the bullet-screen comment display track at the top of the bullet-screen comment display layer 2. It should be noted that, in a process of configuring the to-be-displayed bullet-screen comment based on the bullet-screen comment display rule, all display information in the to-be-displayed bullet-screen comment display process may not be updated. For example, the bullet-screen comment configuration information in the to-be-displayed bullet-screen comment display information is not updated in the foregoing example. In this case, a default configuration solution may also be set, and update of the to-be-displayed bullet-screen comment is selected without performing targeted update. Certainly, a to-be-displayed bullet-screen comment that does not update all display information may not be displayed, and can be displayed only after all display information is updated. A requirement for updating the display information of the to-be-displayed bullet-screen comment may be various. A specific manner is limited by an actual use scenario, and is not limited in this embodiment.

In conclusion, by using the foregoing method, the display form of the to-be-displayed bullet-screen comment is determined, and diversity in a process of displaying the to-be-displayed bullet-screen comment is increased. In addition, the bullet-screen comment display rule of the bullet-screen comment display track may be newly configured, and may be used as a template for performing a new configuration of the bullet-screen comment display type, thereby reducing a waste of development resources.

In some embodiments, to implement diversification of the to-be-displayed bullet-screen comment display process, in addition to processing the configuration of the to-be-displayed bullet-screen comment display process, movement information of the to-be-displayed bullet-screen comment may be further configured. In this embodiment, an exemplary implementation is as follows:

determining a bullet-screen comment movement rule corresponding to the target bullet-screen comment display track; updating bullet-screen comment velocity information, bullet-screen comment acceleration information, and bullet-screen comment angular velocity information of the to-be-displayed bullet-screen comment based on the bullet-screen comment movement rule, to obtain a second target bullet-screen comment; and displaying the second target bullet-screen comment in the target bullet-screen comment display layer.

The bullet-screen comment movement rule may be understood as a rule that specifies a movement form of the to-be-displayed bullet-screen comment. The bullet-screen comment movement velocity information may be understood as information that includes an initial velocity at which movement is performed in a process of displaying the to-be-displayed bullet-screen comment. The bullet-screen comment acceleration information may be understood as information that includes an acceleration for moving in a process of displaying the to-be-displayed bullet-screen comment. The bullet-screen comment angular velocity information may be understood to include information about a movement angular velocity in a process of displaying the to-be-displayed bullet-screen comment. It should be noted that the angular velocity information may further include information about auto rotation and revolution, where auto rotation represents information about a rotational angular velocity for rotating around a central point of the to-be-displayed bullet-screen comment, and revolution indicates the angular velocity at which the to-be-displayed bullet-screen comment rotates around a certain point that is stationary relative to the target bullet-screen comment display layer or the target bullet-screen comment display track during the display process of the to-be-displayed bullet-screen comment display. It should be noted that configuration of the movement rule of the to-be-displayed bullet-screen comment is similar to update of the display rule of the to-be-displayed bullet-screen comment, and may be set in multiple different manners, which is not limited in this embodiment.

Based on this, a rule for configuring the target bullet-screen comment display track in the display process of the to-be-displayed bullet-screen comment is determined, to obtain a bullet-screen comment movement rule that specifies that the to-be-displayed bullet-screen comment is to be displayed on the target bullet-screen comment display track, and to update, based on the bullet-screen comment movement rule, bullet-screen comment velocity information, bullet-screen comment acceleration information, and bullet-screen comment angular velocity information of the to-be-displayed bullet-screen comment, to obtain a second target bullet-screen comment that meets the bullet-screen comment movement rule specified in the target bullet-screen comment display track, and display the second target bullet-screen comment in the target bullet-screen comment display layer.

Still using the foregoing example, a movement rule that is configured by using the top bullet-screen comment track of the bullet-screen comment display layer 2 is as follows: The bullet-screen comment is displayed by sliding from left to right at an initial velocity of 2 mm/s and an acceleration of 2 mm/s$^2$. The bullet-screen comment 1 is configured based on this movement rule, to obtain the second target bullet-screen comment whose movement rule meets the requirement of the top bullet-screen comment track of the bullet-screen comment display layer 2. The obtained second target bullet-screen comment is displayed in the top bullet-screen comment display track of the bullet-screen comment display layer 2.

In conclusion, the to-be-displayed bullet-screen comment is configured based on the movement rule of the target bullet-screen comment display track, so that a process of moving the to-be-displayed bullet-screen comment is enriched, and interest of displaying the to-be-displayed bullet-screen comment is increased. In addition, movement forms similar to objects such as "cloud", "raindrop", and "meteor" may be implemented by configuring the movement rule of the to-be-displayed bullet-screen comment, and an aesthetic sense of the to-be-displayed bullet-screen comment display process is increased.

In some embodiments, in addition to the foregoing separately updating the display information and the movement information of the to-be-displayed bullet-screen comment, a process of simultaneously updating the display information and the movement information of the to-be-displayed bullet-screen comment may be further performed. In this embodiment, an exemplary implementation is as follows:

determining a bullet-screen comment display rule and a bullet-screen comment movement rule that are corresponding to the target bullet-screen comment display track; updating display information of the to-be-displayed bullet-screen comment based on the bullet-screen comment display rule, and updating movement information of the to-be-displayed bullet-screen comment based on the bullet-screen comment movement rule to obtain a third target bullet-screen comment; and displaying the third target bullet-screen comment in the target bullet-screen comment display layer.

The display rule may be understood as a combination of bullet-screen comment size information, bullet-screen comment font information, bullet-screen comment color information, and bullet-screen comment configuration information that are related to the to-be-displayed bullet-screen comment. The movement rule may be understood as a combination of to-be-displayed bullet-screen comment-related bullet-screen comment velocity information, bullet-screen comment acceleration information, and bullet-screen comment angular velocity information.

Based on this, a process of configuring the to-be-displayed bullet-screen comment is similar to the foregoing described process of configuring the to-be-displayed bullet-screen comment, and details are not described herein again.

In conclusion, an overall display effect in a process of displaying the to-be-displayed bullet-screen comment is determined by configuring the display rule and the movement rule of the to-be-displayed bullet-screen comment.

The bullet-screen comment display method provided in this application includes: receiving a to-be-displayed bullet-screen comment; determining a target bullet-screen comment display layer and a target bullet-screen comment display track that are associated with the to-be-displayed bullet-screen comment; and displaying the to-be-displayed bullet-screen comment based on the target bullet-screen comment display layer and the target bullet-screen comment display track. Therefore, the to-be-displayed bullet-screen comment can effectively use a display area of the bullet-screen comment, reduce poor perception caused by bullet-screen comment overlap, save bullet-screen comment processing resources, and improve working efficiency of a bullet-screen comment processing program or apparatus. In addition, different display rules can be configured in different bullet-screen comment display layers and bullet-screen comment display tracks, so that display positions and display forms of the bullet-screen comment are diversified, thereby enriching bullet-screen comment display effects.

Figure 2:
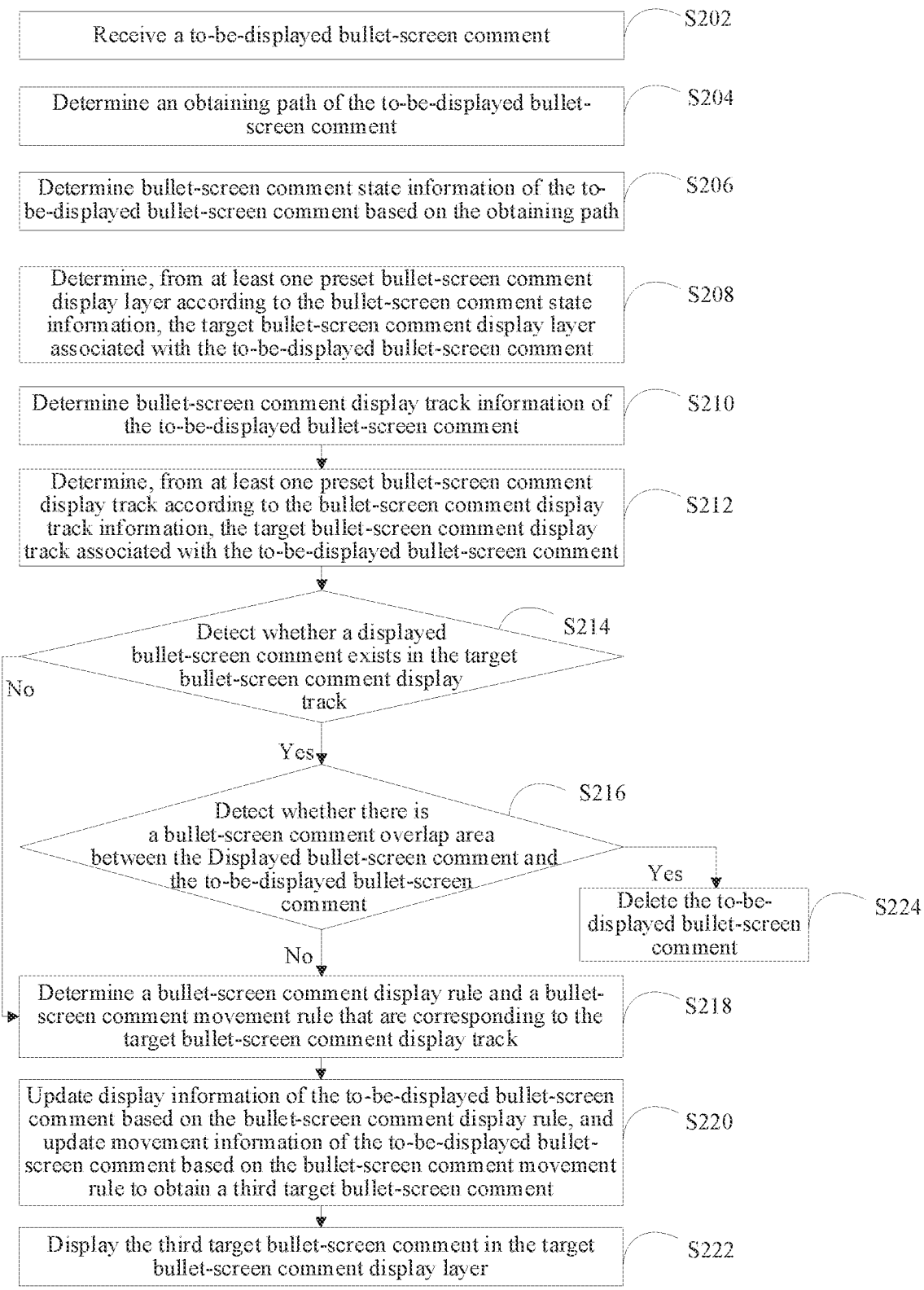
FIG. 2 is a processing flowchart of a bullet-screen comment display method applied to bullet-screen comment display of middle autumn special effects according to some embodiments of this application.

With reference to FIG. 2, the following further describes the bullet-screen comment display method by using an example in which the bullet-screen comment display method provided in this application is used to display a middle autumn special effect bullet-screen comment. FIG. 2 shows a processing flowchart of a bullet-screen comment display method applied to bullet-screen comment display of middle autumn special effects according to some embodiments of this application. The method specifically includes the following steps:

Step S202: Receive a to-be-displayed bullet-screen comment.

Figure 3:
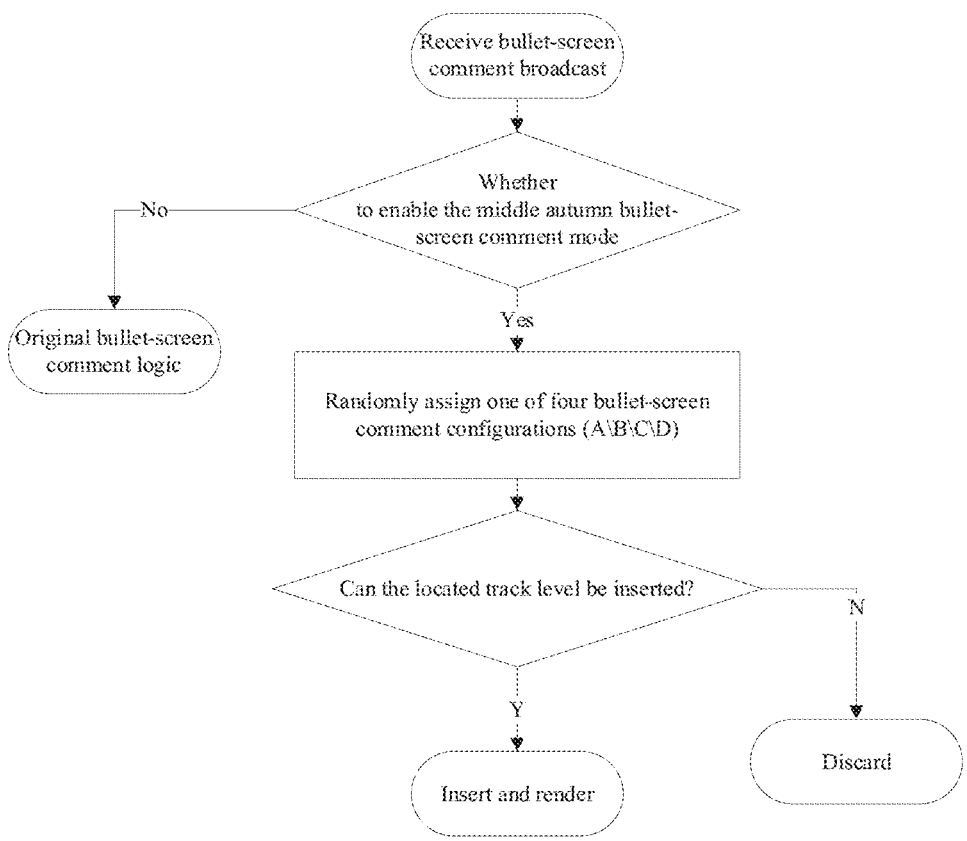
FIG. 3 is a flowchart of a technical solution of bullet-screen comment display of middle autumn special effects according to some embodiments of this application.

In an exemplary embodiment, a user A watches a video C by using a mobile phone B, and obtains a bullet-screen comment D sent by the user A by using the mobile phone B for the video C. In addition, it further needs to determine whether the bullet-screen comment D is displayed by using the middle autumn special effect bullet-screen comment. In a case of yes, step S204 is performed. In a case of no, display is performed based on a bullet-screen comment display form of the bullet-screen comment D. It can be learned from a flowchart of bullet-screen comment display technical solution of medium autumn special effects shown in FIG. 3, that is, after receiving the bullet-screen comment broadcast, that is, after receiving the foregoing to-be-displayed bullet-screen comment, it is determined whether the bullet-screen comment broadcast is enabled in the middle autumn special effect bullet-screen comment display mode. If yes, subsequent processing and displaying of the bullet-screen comment broadcast continue; otherwise, the received bullet-screen comment broadcast is processed and displayed according to an original bullet-screen comment logic. Here, the bullet-screen comment D is displayed in the form of a middle autumn special effect bullet-screen comment.

Step S204: Determine an obtaining path of the to-be-displayed bullet-screen comment.

In an exemplary embodiment, it is determined that the bullet-screen comment D is a bullet-screen comment delivered by a server and received by the mobile phone B.

Step S206: Determine the bullet-screen comment state information of the to-be-displayed bullet-screen comment based on the obtaining path.

Because the bullet-screen comment D is a bullet-screen comment delivered by the server and received by the mobile phone B, it is determined that the bullet-screen comment D is a guest bullet-screen comment, and bullet-screen comment state information of the bullet-screen comment D is guest bullet-screen comment state information.

Step S208: Determine, from at least one preset bullet-screen comment display layer according to the bullet-screen comment state information, the target bullet-screen comment display layer associated with the to-be-displayed bullet-screen comment.

Figure 4:
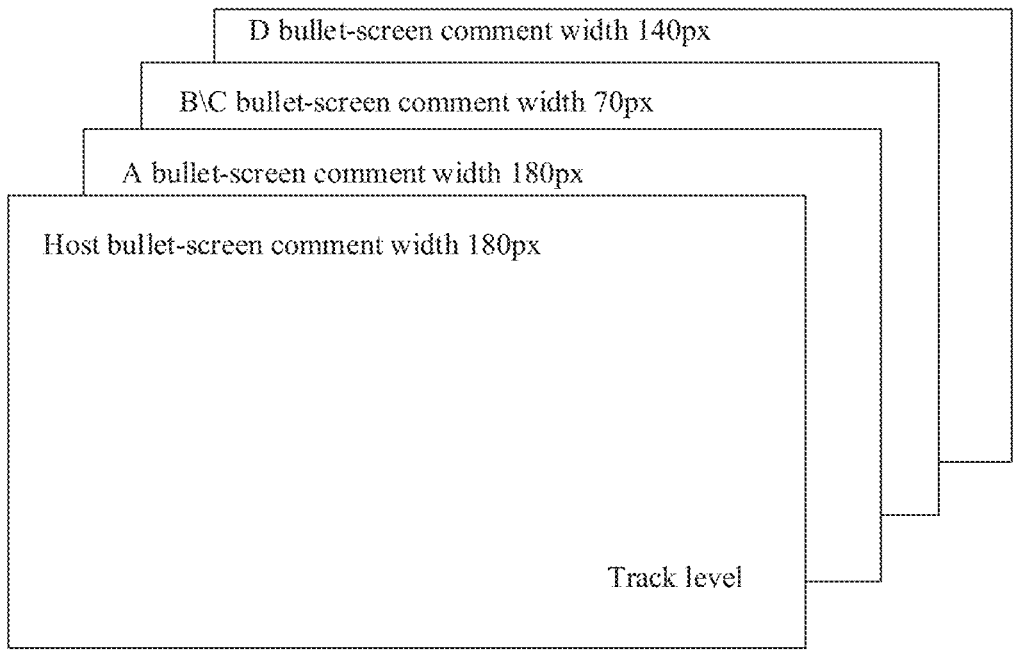
FIG. 4 is a schematic diagram of a bullet-screen comment display layer according to some embodiments of this application.

In an exemplary embodiment, according to the guest bullet-screen comment state information corresponding to the bullet-screen comment D, a fourth layer, that is, a bottom-layer bullet-screen comment display layer, is determined as the target bullet-screen comment display layer by means of random selection. FIG. 4 is a schematic diagram of a bullet-screen comment display layer. A width of a bullet-screen comment display track in a host bullet-screen comment display layer is 180 px. Only a type A of a middle autumn special effect bullet-screen comment form is displayed in the first layer of a guest bullet-screen comment display layer. The type A of the middle autumn special effect bullet-screen comment form is in red regular script, and each of the head and the tail of the bullet-screen comment has a decoration pattern with one month cake. In addition, a width of the bullet-screen comment display track in the bullet-screen comment display layer is 180 px. In the second layer of the guest bullet-screen comment display layer, type B\C middle autumn special effect bullet-screen comments are displayed. In type B, the special effect bullet-screen comment is shown in white Song typeface, and the head part has a decoration pattern with a jade rabbit. In type C, the special effect Song typeface is shown in black Song typeface, and the tail part has a decoration pattern with a jade rabbit. In addition, a width of the bullet-screen comment display track in the bullet-screen comment display layer is 70 px. This setting is used to display a relatively small quantity of bullet-screen comments in the second layer of the guest bullet-screen comment display layer, and then the third layer of the guest bullet-screen comment display layer displays a type D of middle autumn special effect bullet-screen comment display form. The D type of middle autumn special effect bullet-screen comment is a purple and thick-white bullet-screen comment with a moonlit decorative pattern between words, and a width of the bullet-screen comment display track is 140 px. The widths of the bullet-screen comment display tracks in the three layers of guest bullet-screen comment display layers are inconsistent, thereby implementing a sparse visual effect of the upper and lower layers compared with the middle layer.

Step S210: Determine bullet-screen comment display track information of the to-be-displayed bullet-screen comment.

Step S212: Determine, from at least one preset bullet-screen comment display track according to the bullet-screen comment display track information, the target bullet-screen comment display track associated with the to-be-displayed bullet-screen comment.

In an exemplary embodiment, the bullet-screen comment display track selection manner of the bullet-screen comment D is determined as random selection according to the bullet-screen comment display track information indication related to the bullet-screen comment D. Therefore, a bullet-screen comment display track is randomly selected from the third layer of the guest bullet-screen comment display layer, and is determined as the target bullet-screen comment display track.

Step S214: Detect whether a displayed bullet-screen comment exists in the target bullet-screen comment display track.

If yes, perform step S216.

If no, perform step S218.

In an exemplary embodiment, it is determined that a bullet-screen comment being displayed exists in the bullet-screen comment display track corresponding to the bullet-screen comment D. Therefore, next step S216 is performed.

Step S216: Detect whether there is a bullet-screen comment overlap area between the displayed bullet-screen comment and the to-be-displayed bullet-screen comment.

If yes, perform step S224.

If no, perform step S218.

Figure 5:
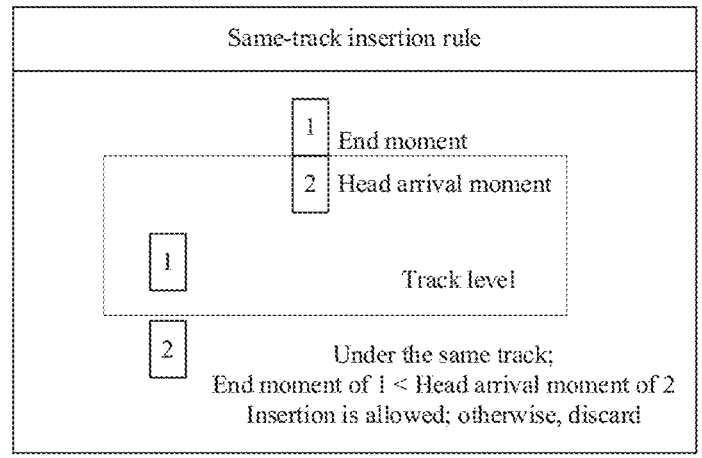
FIG. 5 is a schematic diagram of a same-track insertion rule according to some embodiments of this application.

As shown in a schematic diagram of a same-track insertion rule shown in FIG. 5, between the two bullet-screen comments 1 and 2, as shown in a group of bullet-screen comments 1 and 2 on the left in the figure, when an end moment of 1<a head arrival moment of 2, 2 is allowed to be displayed. Otherwise, as shown in a group of bullet-screen comments 1 and 2 on the right in the figure, when the end moment of 1 is not less than the head arrival moment of 2, 2 is discarded.

Based on this determining, there is no overlap area between the bullet-screen comment D and the displayed bullet-screen comment, and step 218 is performed.

Step S218: Determine a bullet-screen comment display rule and a bullet-screen comment movement rule that are corresponding to the target bullet-screen comment display track.

Step S220: Update display information of the to-be-displayed bullet-screen comment based on the bullet-screen comment display rule, and update movement information of the to-be-displayed bullet-screen comment based on the bullet-screen comment movement rule to obtain a third target bullet-screen comment.

Figure 6:
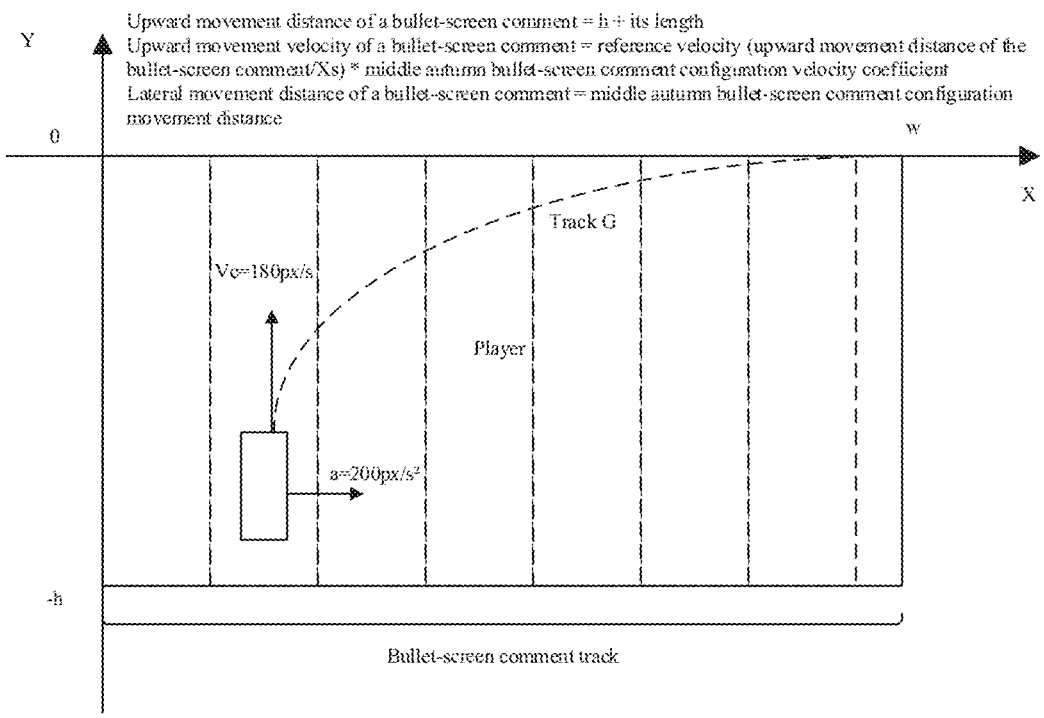
FIG. 6 is a schematic diagram of a bullet-screen comment movement rule according to some embodiments of this application.

Based on this, the display information and the movement information of the bullet-screen comment D are updated by using the bullet-screen comment display rule and the bullet-screen comment movement rule that are corresponding to the target bullet-screen comment display track, to obtain the third target bullet-screen comment. When the display information is updated, the display information of the bullet-screen comment D is updated to the bullet-screen comment display rule D. When the movement information is updated, a schematic diagram of a bullet-screen comment movement rule shown in FIG. 6 is used to calculate lateral and longitudinal movement distances and a movement velocity of the bullet-screen comment. It may be learned, by means of calculation, that the bullet-screen comment D is in the third layer of the guest bullet-screen comment display layer, the movement velocity of the bullet-screen comment D in the vertical direction is 180 px/s, the horizontal direction initial velocity is 0, the acceleration direction is right, and the size is 200 px/s$^2$. Finally, the bullet-screen comment D is displayed in a horizontal parabola form such as a track G in the third layer of the guest bullet-screen comment display layer.

Step S222: Display the third target bullet-screen comment in the target bullet-screen comment display layer.

Step S224: Delete the to-be-displayed bullet-screen comment.

The bullet-screen comment display method provided in this application includes: receiving a to-be-displayed bullet-screen comment; determining a target bullet-screen comment display layer and a target bullet-screen continent display track that are associated with the to-be-displayed bullet-screen comment; and displaying the to-be-displayed bullet-screen comment based on the target bullet-screen comment display layer and the target bullet-screen comment display track. Therefore, the to-be-displayed bullet-screen comment can effectively use a display area of the bullet-screen comment, reduce poor perception caused by bullet-screen comment overlap, save bullet-screen comment processing resources, and improve working efficiency of a bullet-screen comment processing program or apparatus. In addition, different display rules can be configured in different bullet-screen comment display layers and bullet-screen comment display tracks, so that display positions and display forms of the bullet-screen comment are diversified, thereby enriching bullet-screen comment display effects.

Figure 7:
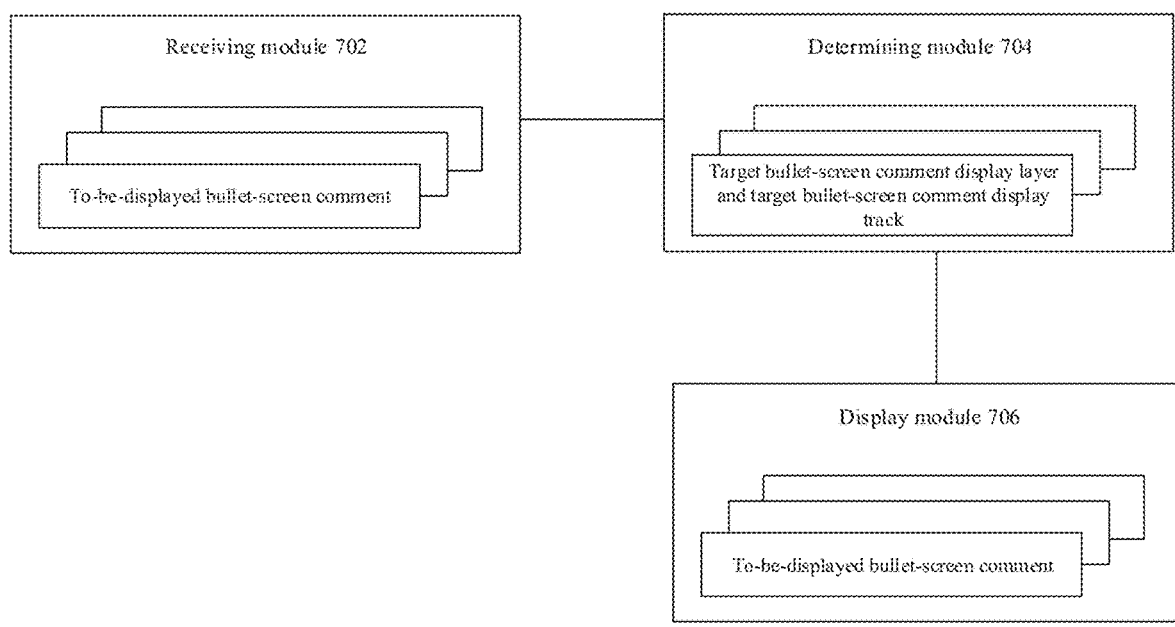
FIG. 7 is a schematic diagram of a structure of a bullet-screen comment display apparatus according to some embodiments of this application.

Corresponding to the foregoing method embodiments, this application further provides some embodiments of a bullet-screen comment display apparatus. FIG. 7 is a schematic diagram of a structure of a bullet-screen comment display apparatus according to some embodiments of this application. As shown in FIG. 7, the apparatus includes:
- a receiving module 702, configured to receive a to-be-displayed bullet-screen comment;
- a determining module 704, configured to determine a target bullet-screen comment display layer and a target bullet-screen comment display track that are associated with the to-be-displayed bullet-screen comment; and
- a display module 706, configured to display, in the target bullet-screen comment display layer, the to-be-displayed bullet-screen comment based on the target bullet-screen comment display track.

In an optional embodiment, the determining module 704 is further configured to:
determine bullet-screen comment state information of the to-be-displayed bullet-screen comment; and determine, from at least one preset bullet-screen comment display layer according to the bullet-screen comment state information, the target bullet-screen comment display layer associated with the to-be-displayed bullet-screen comment.

In an optional embodiment, the determining module 704 is further configured to:
determine an obtaining path of the to-be-displayed bullet-screen comment; and determine the bullet-screen comment state information of the to-be-displayed bullet-screen comment based on the obtaining path; and correspondingly, the determining, according to the bullet-screen comment state information, the target bullet-screen comment display layer associated with the to-be-displayed bullet-screen comment includes: in a case in which the bullet-screen comment state information is guest bullet-screen comment state information, selecting a guest bullet-screen comment display layer associated with the to-be-displayed bullet-screen comment as the target bullet-screen comment display layer; and in a case in which the bullet-screen comment state information is host bullet-screen comment state information, selecting a host bullet-screen comment display layer associated with the to-be-displayed bullet-screen comment as the target bullet-screen comment display layer.

In an optional embodiment, the determining module 704 is further configured to:
determine bullet-screen comment display track information of the to-be-displayed bullet-screen comment; and determine, from at least one preset bullet-screen comment display track according to the bullet-screen comment display track information, the target bullet-screen comment display track associated with the to-be-displayed bullet-screen comment.

In an optional embodiment, the display module 706 is further configured to:
determine a bullet-screen comment display rule corresponding to the target bullet-screen comment display track; update bullet-screen comment size information, bullet-screen comment font information, bullet-screen comment color information, and bullet-screen comment configuration information of the to-be-displayed bullet-screen comment based on the bullet-screen comment display rule, to obtain a first target bullet-screen comment; and display the first target bullet-screen comment in the target bullet-screen comment display layer.

In an optional embodiment, the display module 706 is further configured to:
determine a bullet-screen comment movement rule corresponding to the target bullet-screen comment display track; update bullet-screen comment velocity information, bullet-screen comment acceleration information, and bullet-screen comment angular velocity information of the to-be-displayed bullet-screen comment based on the bullet-screen comment movement rule, to obtain a second target bullet-screen comment; and display the second target bullet-screen comment in the target bullet-screen comment display layer.

In an optional embodiment, the display module 706 is further configured to:
determine a bullet-screen comment display rule and a bullet-screen comment movement rule that are corresponding to the target bullet-screen comment display track; update display information of the to-be-displayed bullet-screen comment based on the bullet-screen comment display rule, and update movement information of the to-be-displayed bullet-screen comment based on the bullet-screen comment movement rule to obtain a third target bullet-screen comment; and display the third target bullet-screen comment in the target bullet-screen comment display layer.

In an optional embodiment, the bullet-screen comment display apparatus further includes:
a detection module, configured to detect whether a displayed bullet-screen comment exists in the target bullet-screen comment display track; if a displayed bullet-screen comment does not exist, perform the step of displaying, in the target bullet-screen comment display layer, the to-be-displayed bullet-screen comment based on the target bullet-screen comment display track; if a displayed bullet-screen comment exists, detect whether there is a bullet-screen comment overlap area between the displayed bullet-screen comment and the to-be-displayed bullet-screen comment; if no, perform the step of displaying, in the target bullet-screen comment display layer, the to-be-displayed bullet-screen comment based on the target bullet-screen comment display track; and if yes, delete the to-be-displayed bullet-screen comment.

In an optional embodiment, the bullet-screen comment display apparatus further includes:

a configuration module, configured to receive bullet-screen comment display rule information and bullet-screen comment display layer information that are delivered by a server; creating a bullet-screen comment display layer and a bullet-screen comment display track in the bullet-screen comment display layer according to the bullet-screen comment display layer information; and configure a rule for the bullet-screen comment display layer and a corresponding bullet-screen comment display track based on the bullet-screen comment display rule information.

In an optional embodiment, the bullet-screen comment display apparatus further includes:

a determining module, configured to: determine a display policy for the to-be-displayed bullet-screen comment, and determine whether the display policy is a target display policy; if yes, perform a step of determining a target bullet-screen comment display layer and a target bullet-screen comment display track that are associated with the to-be-displayed bullet-screen comment; and if no, process and display the to-be-displayed bullet-screen comment according to the display policy.

According to the bullet-screen comment display apparatus provided in this application, the to-be-displayed bullet-screen comment can effectively use a display area of the bullet-screen comment, reduce poor perception caused by bullet-screen comment overlap, save bullet-screen comment processing resources, and improve working efficiency of a bullet-screen comment processing program or apparatus. In addition, different display rules can be configured in different bullet-screen comment display layers and bullet-screen comment display tracks, so that display positions and display forms of the bullet-screen comment are diversified, thereby enriching bullet-screen comment display effects.

The foregoing describes a schematic solution of the bullet-screen comment display apparatus in the embodiments. It is worthwhile to note that the technical solution of the bullet-screen comment display apparatus and the technical solution of the foregoing bullet-screen comment display method belong to the same concept. For details not described in the technical solution of the bullet-screen comment display apparatus, references can be made to the descriptions of the technical solution of the foregoing bullet-screen comment display method.

Figure 8:
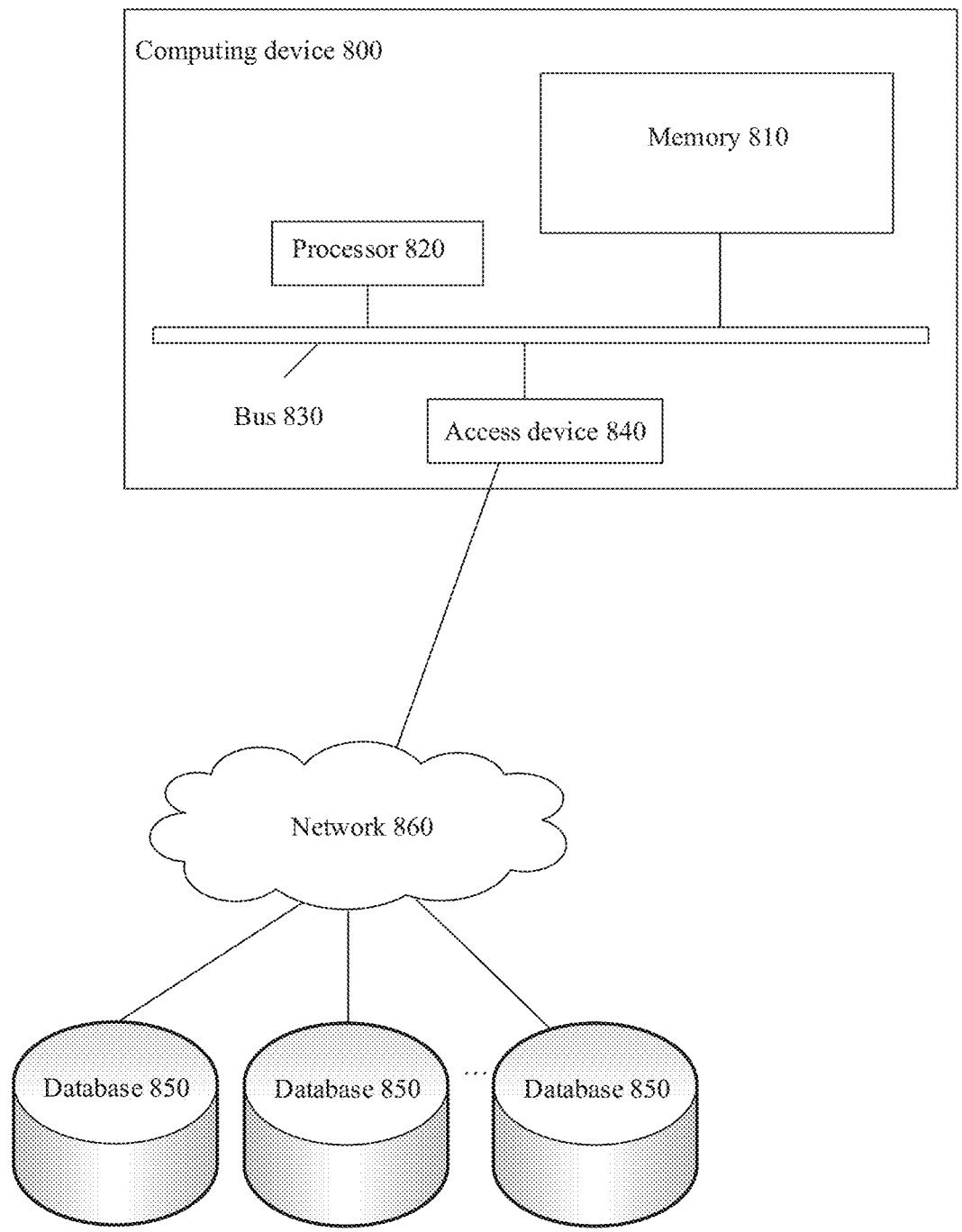
FIG. 8 is a block diagram of a structure of a computing device according to some embodiments of this application.

FIG. 8 is a block diagram of a structure of a computing device 800 according to some embodiments of this application. Components of the computing device 800 include but are not limited to a memory 810 and a processor 820. The processor 820 and the memory 810 are connected by using a bus 830, and a database 850 is configured to store data.

The computing device 800 further includes an access device 840, and the access device 840 enables the computing device 800 to communicate via one or more networks 860. Examples of these networks include a public switched telephone network (PSTN), a local area network (LAN), a wide area network (WAN), a private area network (PAN), or a combination of communication networks such as the Internet. The access device 840 may include one or more of any type of wired or wireless network interface (for example, a network interface card (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In some embodiments of this application, the foregoing components of the computing device 800 and other components not shown in FIG. 8 may also be connected to each other, for example, by using the bus. It should be understood that the block diagram of the structure of the computing device shown in FIG. 8 is merely used as an example instead of a limitation on the scope of this application. A person skilled in the art may add or substitute other components as required.

The computing device 800 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a still computing device such as a desktop computer or a personal computer (PC). The computing device 800 may be a mobile or still server.

The processor 820 performs the steps of the bullet-screen comment display method when executing the instructions.

The foregoing describes a schematic solution of a computing device in the embodiments. It should be noted that the technical solution of the computing device and the technical solution of the bullet-screen comment display method belong to a same concept. For details not described in detail in the technical solution of the computing device, refer to the descriptions of the technical solution of the bullet-screen comment display method.

Some embodiments of this application further provide a computer-readable storage medium, where the computer-readable storage medium stores computer instructions, and when the instructions are executed by a processor, the steps of the bullet-screen comment display method are implemented.

The foregoing describes a schematic solution of a computer-readable storage medium in the embodiments. It should be noted that the technical solution of the storage medium and the technical solution of the bullet-screen comment display method belong to a same concept. For details not described in detail in the technical solution of the storage medium, refer to the descriptions of the technical solution of the bullet-screen comment display method.

Exemplary embodiments of this application are described above. Other embodiments fall within the scope of the appended claims. In some cases, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code. The computer program code may be in a source code form, an object code form, an executable file form, an intermediate form, or the like. The computer-readable medium may include: any physical entity or apparatus capable of carrying the computer program code, a recording medium, a USB disk, a mobile hard disk drive, a magnetic disk, an optical disc, a computer memory, a read-only memory (ROM), a random access memory (RAM), an electrical carrier signal, a telecommunications signal, a software distribution medium, and the like. It is worthwhile to note that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It is worthwhile to note that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all exemplary embodiments, and involved actions and modules are not necessarily mandatory to this application.

In the foregoing embodiments, descriptions of the embodiments have respective focuses, For a part that is not described in detail in some embodiments, references can be made to related descriptions in another embodiment.

The embodiments of this application disclosed above are merely intended to help describe this application. The optional embodiments do not describe all details, and the present invention is not limited to the specific implementations. Clearly, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A method, comprising:
   receiving a to-be-displayed bullet-screen comment;
   determining a target bullet-screen comment display layer and a target bullet-screen comment display track that are associated with the to-be-displayed bullet-screen comment;
   displaying, in the target bullet-screen comment display layer, the to-be-displayed bullet-screen comment based on the target bullet-screen comment display track;
   determining an obtaining path of the to-be-displayed bullet-screen comment; and
   determining bullet-screen comment state information of the to-be-displayed bullet-screen comment based on the obtaining path; and wherein
   determining the target bullet-screen comment display layer associated with the to-be-displayed bullet-screen comment comprises:
   if the bullet-screen comment state information is guest bullet-screen comment state information, selecting a guest bullet-screen comment display layer associated with the to-be-displayed bullet-screen comment as the target bullet-screen comment display layer; and
   if the bullet-screen comment state information is host bullet-screen comment state information, selecting a host bullet-screen comment display layer associated with the to-be-displayed bullet-screen comment as the bullet-screen comment display layer.

2. The method according to claim 1, wherein determining the target bullet-screen comment display layer associated with the to-be-displayed bullet-screen comment further comprises:
   determining bullet-screen comment state information of the to-be-displayed bullet-screen comment; and
   determining, from at least one preset bullet-screen comment display layer, the target bullet-screen comment display layer associated with the to-be-displayed bullet-screen comment according to the bullet-screen comment state information.

3. The method according to claim 1, wherein determining the target bullet-screen comment display track associated with the to-be-displayed bullet-screen comment comprises:
   determining bullet-screen comment display track information of the to-be-displayed bullet-screen comment; and
   determining, from at least one preset bullet-screen comment display track, the target bullet-screen comment display track associated with the to-be-displayed bullet-screen comment according to the bullet-screen comment display track information.

4. The method according to claim 1, wherein displaying the to-be-displayed bullet-screen comment based on the target bullet-screen comment display track comprises:
   determining a bullet-screen comment display rule corresponding to the target bullet-screen comment display track;
   updating bullet-screen comment size information, bullet-screen comment font information, bullet-screen comment color information, and bullet-screen comment configuration information of the to-be-displayed bullet-screen comment based on the bullet-screen comment display rule, to obtain a first target bullet-screen comment; and
   displaying the first target bullet-screen comment in the target bullet-screen comment display layer.

5. The method according to claim 1, wherein displaying the to-be-displayed bullet-screen comment based on the target bullet-screen comment display track comprises:
   determining a bullet-screen comment movement rule corresponding to the target bullet-screen comment display track;
   updating bullet-screen comment velocity information, bullet-screen comment acceleration information, and bullet-screen comment angular velocity information of the to-be-displayed bullet-screen comment based on the bullet-screen comment movement rule, to obtain a second target bullet-screen comment; and
   displaying the second target bullet-screen comment in the target bullet-screen comment display layer.

6. The method according to claim 1, wherein displaying the to-be-displayed bullet-screen comment based on the target bullet-screen comment display track comprises:
   determining a bullet-screen comment display rule and a bullet-screen comment movement rule that correspond to the target bullet-screen comment display track;
   updating display information of the to-be-displayed bullet-screen comment based on the bullet-screen comment display rule and updating movement information of the to-be-displayed bullet-screen comment based on the bullet-screen comment movement rule, to obtain a third target bullet-screen comment; and
   displaying the third target bullet-screen comment in the target bullet-screen comment display layer.

7. The method according to claim 1, wherein before the displaying, in the target bullet-screen comment display layer, the to-be-displayed bullet-screen comment based on the target bullet-screen comment display track, the method further comprises:
- detecting whether there is a displayed bullet-screen comment in the target bullet-screen comment display track;
- in response to detecting that there is no displayed bullet-screen comment in the target bullet-screen comment display track, displaying, in the target bullet-screen comment display layer, the to-be-displayed bullet-screen comment based on the target bullet-screen comment display track;
- in response to detecting that there is a displayed bullet-screen comment in the target bullet-screen comment display track, detecting whether there is a bullet-screen comment overlap area between the displayed bullet-screen comment and the to-be-displayed bullet-screen comment;
- in response to detecting that there is no bullet-screen comment overlap area between the displayed bullet-screen comment and the to-be-displayed bullet-screen comment, displaying, in the target bullet-screen comment display layer, the to-be-displayed bullet-screen comment based on the target bullet-screen comment display track; and
- in response to detecting that there is a bullet-screen comment overlap area between the displayed bullet-screen comment and the to-be-displayed bullet-screen comment, deleting the to-be-displayed bullet-screen comment.

8. The method according to claim 1, wherein before determining the target bullet-screen comment display layer and the target bullet-screen comment display track that are associated with the to-be-displayed bullet-screen comment, the method comprises:
- receiving bullet-screen comment display rule information and bullet-screen comment display layer information from a server;
- creating a bullet-screen comment display layer and a bullet-screen comment display track in the bullet-screen comment display layer according to the bullet-screen comment display layer information; and
- configuring a rule for the bullet-screen comment display layer and a corresponding bullet-screen comment display track based on the bullet-screen comment display rule information.

9. The method according to claim 1, wherein after receiving the to-be-displayed bullet-screen comment, the method further comprises:
- determining a display policy for the to-be-displayed bullet-screen comment;
- determining whether the display policy is a target display policy;
- in response to determining that the display policy is the target display policy, determining the target bullet-screen comment display layer and the target bullet-screen comment display track that are associated with the to-be-displayed bullet-screen comment; and
- in response to determining that the display policy is not the target display policy, processing and displaying the to-be-displayed bullet-screen comment according to the display policy.

10. A computer device, comprising:
a processor; and
a memory, wherein the memory stores computer executable instructions that, when executed by the processor, cause the processor to:
- receive a to-be-displayed bullet-screen comment;
- determine a target bullet-screen comment display layer and a target bullet-screen comment display track that are associated with the to-be-displayed bullet-screen comment;
- display, in the target bullet-screen comment display layer, the to-be-displayed bullet-screen comment based on the target bullet-screen comment display track;
- determine an obtaining path of the to-be-displayed bullet-screen comment; and
- determine bullet-screen comment state information of the to-be-displayed bullet-screen comment based on the obtaining path; and wherein causing the processor to determine the target bullet-screen comment display layer associated with the to-be-displayed bullet-screen comment comprises:
  - if the bullet-screen comment state information is guest bullet-screen comment state information, causing the processor to select a guest bullet-screen comment display layer associated with the to-be-displayed bullet-screen comment as the target bullet-screen comment display layer; and
  - if the bullet-screen comment state information is host bullet-screen comment state information, causing the processor to select a host bullet-screen comment display layer associated with the to-be-displayed bullet-screen comment as the bullet-screen comment display layer.

11. The computer device according to claim 10, wherein causing the processor to determine the target bullet-screen comment display layer associated with the to-be-displayed bullet-screen comment further comprises:
- determining bullet-screen comment state information of the to-be-displayed bullet-screen comment; and
- determining, from at least one preset bullet-screen comment display layer, the target bullet-screen comment display layer associated with the to-be-displayed bullet-screen comment according to the bullet-screen comment state information.

12. The computer device according to claim 10, wherein determining the target bullet-screen comment display track associated with the to-be-displayed bullet-screen comment comprises:
- determining bullet-screen comment display track information of the to-be-displayed bullet-screen comment; and
- determining, from at least one preset bullet-screen comment display track, the target bullet-screen comment display track associated with the to-be-displayed bullet-screen comment according to the bullet-screen comment display track information.

13. The computer device according to claim 10, wherein displaying the to-be-displayed bullet-screen comment based on the target bullet-screen comment display track comprises:
- determining a bullet-screen comment display rule corresponding to the target bullet-screen comment display track;
- updating bullet-screen comment size information, bullet-screen comment font information, bullet-screen comment color information, and bullet-screen comment configuration information of the to-be-displayed bullet-screen comment based on the bullet-screen comment display rule, to obtain a first target bullet-screen comment; and
- displaying the first target bullet-screen comment in the target bullet-screen comment display layer.

14. A non-transitory computer-readable storage medium storing computer instructions that, when executed by a processor, cause the processor to:
- receive a to-be-displayed bullet-screen comment;
- determine a target bullet-screen comment display layer and a target bullet-screen comment display track that are associated with the to-be-displayed bullet-screen comment;
- display, in the target bullet-screen comment display layer, the to-be-displayed bullet-screen comment based on the target bullet-screen comment display track;
- determine an obtaining path of the to-be-displayed bullet-screen comment; and
- determine bullet-screen comment state information of the to-be-displayed bullet-screen comment based on the obtaining path; and wherein causing the processor to determine the target bullet-screen comment display layer associated with the to-be-displayed bullet-screen comment comprises:
  - if the bullet-screen comment state information is guest bullet-screen comment state information, causing the processor to select a guest bullet-screen comment display layer associated with the to-be-displayed bullet-screen comment as the target bullet-screen comment display layer; and
  - if the bullet-screen comment state information is host bullet-screen comment state information, causing the processor to select a host bullet-screen comment display layer associated with the to-be-displayed bullet-screen comment as the bullet-screen comment display layer.

15. The non-transitory computer-readable storage medium according to claim 14, wherein causing the processor to determine the target bullet-screen comment display layer associated with the to-be-displayed bullet-screen comment further comprises:
- determining bullet-screen comment state information of the to-be-displayed bullet-screen comment; and
- determining, from at least one preset bullet-screen comment display layer, the target bullet-screen comment display layer associated with the to-be-displayed bullet-screen comment according to the bullet-screen comment state information.

16. The non-transitory computer-readable storage medium according to claim 14, wherein determining the target bullet-screen comment display track associated with the to-be-displayed bullet-screen comment comprises:
- determining bullet-screen comment display track information of the to-be-displayed bullet-screen comment; and
- determining, from at least one preset bullet-screen comment display track, the target bullet-screen comment display track associated with the to-be-displayed bullet-screen comment according to the bullet-screen comment display track information.

17. The non-transitory computer-readable storage medium according to claim 14, wherein displaying the to-be-displayed bullet-screen comment based on the target bullet-screen comment display track comprises:
- determining a bullet-screen comment display rule corresponding to the target bullet-screen comment display track;
- updating bullet-screen comment size information, bullet-screen comment font information, bullet-screen comment color information, and bullet-screen comment configuration information of the to-be-displayed bullet-screen comment based on the bullet-screen comment display rule, to obtain a first target bullet-screen comment; and
- displaying the first target bullet-screen comment in the target bullet-screen comment display layer.

* * * * *